3,516,959
SOLID POLYMER COMPOSITIONS HAVING FLAME RETARDANT AND DRIP RESISTANT PROPERTIES AND ADDITIVE COMPOSITIONS FOR IMPARTING SAID PROPERTIES THERETO
Donald Moore Jonas, Great Dunmow, England, assignor to Berk Limited
No Drawing. Filed Dec. 14, 1965, Ser. No. 513,858
Claims priority, application Great Britain, Dec. 18, 1964, 51,680/64
Int. Cl. C09k 3/28; C08h 9/06; C08k 1/84
U.S. Cl. 260—28                                    5 Claims

ABSTRACT OF THE DISCLOSURE

A composition comprising an admixture of at least one flame retardant with an organophilic cation modified clay is disclosed. This composition is used as an additive for imparting flame-retardancy and drip resistant properties to combustible synthetic thermoplastic polymers, such as polystyrene, polyethylene, polypropylene, nylon and the like, which drip when heated beyond their softening points. The polymer composition containing the additive is also disclosed.

---

This invention is concerned with synthetic thermoplastic polymer compositions which contain flame-retardants and have drip-resistant properties.

The synthetic thermoplastic polymers with which this invention is concerned (hereinafter referred to, for convenience, simply as "synthetic thermoplastic polymers") are those which are combustible and, in addition to being combustible, melt an drip readily when heated beyond their softening point. While the flammability of these polymers can be substantially reduced by the incorporation therein of one or more flame retardants, they represent (in the absence of appropriate further additives) a considerable fire hazard even when they contain flame retardants since when heated beyond their softening point, they will melt and hot material will drip or flow therefrom onto surrounding areas and increase the risk of ignition of surrounding materials even though the polymer itself may not burn. Examples of such polymers are polystyrene, polyethylene, polyamides, such as nylon.

We have now found that the tendency of synthetic thermoplastic polymers to melt an drip when heated to temperatures above their softening points can be substantially reduced by incorporating therein a small proportion (that is less than 10%, based on the weight of the polymer) of an organophilic cation modified clay. The present invention accordingly comprises a polymer composition comprising a synthetic thermoplastic polymer, and, incorporated therein, one or more flame retardants and up to 10%, based on the weight of the polymer, of an organophilic cation modified clay.

Suitable organophilic cation modified clays for use in accordance with the invention are cationic clays of medium or high cation exchange capacity, the cation of which is replaced by a so-called onium base. The onium base may contain a pentavalent atom as in the cases of ammonium, phosphonium, arsonium and stibonium bases; a tetravalent atom as in the cases of oxonium, sulphonium, selenonium, telluronium and stannonium bases; or a trivalent atom as in the case of an iodonium base. The cation exchange capacity is generally reported as the number of milliequivalents of exchangeable base which can be exchanged per 100 grams of clay dried at 105° C. The cationic clays have very different cation-exchange capacities, the numerical values varying from about 3 to about 120 depending upon the type of clay. On this basis clays have been empirically divided into those of low cation-exchange capacity, i.e. up to about 15; those of medium cation-exchange capacity, i.e. above 15 but below 40; and those of high cation-exchange capacity, i.e. 40 and above.

Examples of clays having a medium cation-exchange capacity are sepiolite and attapulgite. Examples of clays having a high cation-exchange capacity are the montmorillonites, such as sodium, potassium, lithium and other bentonites, particularly those of the Wyoming and South Dakota (U.S.A.) types and magnesium bentonite (which is also known as hectorite), saponite and nentronite. Certain so-called "synthetic clays" are also known and provided that they are equivalent to the natural clays described above in their ability to react with onium compounds, they are suitable.

Details of the preparation of organophilic cation modified clays are given, for instance, in British specification No. 664,830 and U.S. Pat. No. 2,531,440. If desired, the sodium ion content of the clay may be increased prior to reaction with the onium compound as described in British specification No. 904,880.

Specific examples of suitable organophilic cation modified clays are: dimethyl dioctadecyl ammonium sepiolite, octadecyl ammonium montmorillonite, dimethyl dioctadecyl ammonium montmorillonite, and dimethyl dioctadecyl ammonium hectorite.

Another class of organophilic cation modified clays that can be used are cationic clays of high cation-exchange capacity, e.g. montmorillonites, which are associated with an aliphatic amine containing at least 12 carbon atoms, such as dodecylamine, octadecylamine, methyloctadecylamine, dioctadecylamine and dimethyloctadecylamine, or a derivative thereof, for example the derivatives of such amines obtained by fusing them with a non-ionic, long chain, organic polar compound, such as stearamide, stearonitrile and cetyl alcohol.

A wide variety of flame retardants, both organic and inorganic and mixtures thereof, can be used in the polymer compositions. The flame retardants can be halogen-containing, examples of flame retardants of this type being the chlorinated paraffins sold under the trade mark "Cereclor," tris-β-chloroethyl phosphate, tribromophenol, ammonium chloride and ammonium bromide (the ammonium halides may be coated with an organophilic coating, such as stearic acid, prior to incorporation in the polymer composition). Suitable halogen-free flame retardants are, for example, phosphoric acid esters, such as tri-tolyl phosphate, antimony trioxide and arsenic trioxide.

The proportion of total flame retardant may suitably range from 0.5 up to about 50%, based on the weight of the polymer. The proportion of flame retardant used will depend for instance upon the nature of the polymer into which it is to be incorporated and the degree of flame retardancy required in the polymer composition. The proportion of organophilic cation modified clay is suitably from 0.5 to 5%, based on the weight of the polymer, although higher proportions may be desirable in some cases.

The polymer compositions can also, of course, contain one or more plasticisers, anti-oxidants, stabilisers, antistatic agents, fillers, pigments and the like, but the amounts of such additional materials should not be such as to detract deleteriously from the flame-retardant and drip resistant character of the composition as a whole.

The organophilic cation modified clay can be added as a dry powder directly to the unplasticised synthetic thermoplastic polymer during prosessing of the polymer. If desired, the organophilic cation modified clay may be dispersed in a volatile liquid organic vehicle prior to incorporation in the polymer; examples of such vehicles include trichloroethylene, toluene, xylene and white spirit.

A masterbatch of polymer and organophilic cation modified clay may be used as the method of introducing the organophilic cation modified clay; such a masterbatch may be made by dispersing the organophilic cation modified clay in a volatile liquid organic vehicle, such as toluene, and then incorporating the dispersion in a proportion of polymer which may itself be dispersed in an organic liquid vehicle. The volatile organic liquid vehicle may be substantially completely removed prior to or during processing of the unplasticised synthetic thermoplastic polymer. The organophilic cation modified clay may, on the other hand, be dispersed in a relatively non-volatile vehicle, including, for instance, the additives for the polymer, such as the flame retardant, and vehicles such as paraffin wax and a low molecular weight polyethylene. In such cases the vehicle remains in the synthetic thermoplastic polymer after processing. Additionally, the use of an organophilic cation modified clay dispersed in a non-volatile vehicle may be accompanied by the addition of a volatile liquid organic vehicle which may be substantially completely removed prior to or during processing of the polymer. For best results the modified clay is treated with an organic polar liquid prior to its incorporation in the polymer. Methanol has been found to be suitable for this purpose, but other polar liquids, such as acetone, methyl ethyl ketone and propylene carbonate, can also be used.

Mixtures of the modified clay and one or more flame retardants, particularly such mixtures as are obtained by mixing the modified clay and flame retardant(s) in the presence of a volatile organic liquid, adding a polar organic liquid to the mixture, continuing mixing and then evaporating the organic liquids to obtain a mixture of the modified clay and flame retardant(s) in gel form, represent a preferred form of additive composition for the synthetic thermoplastic polymers.

In order that the invention may be more fully understood, the following examples are given by way of illustration only. In these examples all parts are parts by weight per hundred parts by weight of polymer.

EXAMPLES 1–16

A series of low density polyethylene compositions (the polymer being that sold by I.C.I. Ltd. under the trademark "Alkathene" XDG33) were prepared, the compositions containing various amounts of organophilic cation modified clays and flame retardants and the flammability and "dripping rate" of the compositions and of the polymer without these additives were determined.

The compositions were prepared as follows. The modified clay and the flame retardant(s) were added to toluene and the mixture was stirred with a high speed stirrer for 5 minutes, methanol was then added and the mixture stirred for a further 5 minutes prior to colloid milling in a mill having a clearance of 0.002 inch. The resultant gel was stored in an oven at 90° C. for 12 hours to remove the toluene and methanol.

The low density polyethylene was added to a mill and the previously prepared gel was added after the polymer had fluxed. The crepe was cross blended frequently and mixing was continued for 5 minutes. The crepe was cut off from the mill and pressed into sheets of 1/8 inch thickness. The mill temperature was 155° C. and the pressing temperature was 145° C.

The test for flammability was essentially as described in A.S.T.M. D635–56T with the following modifications:

(i) Wire gauze was not positioned below the sample during testing.

(ii) 3 specimens having a length of 4½ in., a width of ½ in. and a thickness of 1/8 in. (cut from the 1/8 in. thick sheets mentioned above) of each composition were tested. Each specimen was marked by scribing three lines, respectively ¼ in., 2¼ in. and 4¼ in. from one end, thereon.

(iii) The free end of each specimen was ignited with the burner flame and the stop-clock was started when the bulk of the flame reached the first mark, ¼ in. from the free end. The time, in seconds, until the bulk of the flame reached the third mark, 4¼ in. from the free end, was measured.

(iv) When the flame reached the second mark, 2¼ in. from the free end, the number of drips that fell in 15 seconds was counted and this was recorded as the dripping rate.

(In Examples 13–16 inclusive, the specimens had a length of 6 in., a width of ½ in. and a thickness of 0.006 in., and each specimen was marked by scribing two lines, one at 1 in. and the other at 5 in. from one end of the specimen. The dripping rate was taken 75 seconds after the flame had reached the first mark).

(v) If the specimen was self-extinguishing, in order to obtain a dripping rate, the burner flame was applied so as to keep the specimen burning (those examples in which this was necessary are marked with an asterisk).

(vi) Testing was discontinued after 3 speciments had been tested and found to be within the following limits:

For dripping rate:
    0–5   ±1
    5–10  ±2
    10–20 ±3
    20–40 ±4
For burning rate: ±10 seconds The average of the burning rate and the dripping rate for the 3 specimens is recorded in the following table; in those cases where the interval between successive drips was greater than 15 seconds, the dripping rate is given as <1.

The results obtained were as follows:

| Ex. No. | I Organophilic cation modified clay Type | Parts | II Flame Retardant Type | Parts | Ratio I:II | Rate of Burning (secs.) | Dripping rate |
|---|---|---|---|---|---|---|---|
| Blank 1 | | | | | | 220 | (1) |
| 1 | B.38 | 2 | "Cereclor" P50 / Sb$_2$O$_3$ | 10 / 5 | 1:7.5 | 177 | 1–2 |
| 2 | B.38 | 2 | "Cereclor" P50 / Sb$_2$O$_3$ | 5 / 5 | 1:5 | 190 | 1–2 |
| 3* | B.38 | 2 | "Cereclor" 70 / Sb$_2$O$_3$ | 10 / 5 | 1:7.5 | 360 | 8 |
| 4* | B.38 | 2 | "Cereclor" 70 / Sb$_2$O$_3$ | 5 / 5 | 1:5 | 225 | 6 |
| 5 | B.38 | 2 | T.C.E.P. | 5 | 1:2.5 | 177 | 1 |
| 6 | B.38 | 2 | T.C.E.P. | 2.5 | 1:1.25 | 185 | <1 |
| 7 | B.38 | 2 | T.T.P. | 5 | 1:2.5 | 175 | <1 |
| 8 | B.38 | 2 | T.T.P. | 2.5 | 1:1.25 | 170 | <1 |
| 9 | B.34 | 2 | NH$_4$Br | 5 | 1:2.5 | 220 | 10 |
| 10 | B.Sp | 2 | T.C.E.P. | 4 | 1:2 | 135 | <1 |
| 11 | B.Sp | 4 | T.C.E.P. | 8 | 1:2 | 160 | <1 |
| 12 | B.Sp | 4 | "Cereclor" P50 | 4 | 1:1 | 210 | 10 |
| 13 | B.38 | 0.5 | ___do___ | 0.5 | 1:1 | 150 | 11 |
| 14 | B.38 | 1 | ___do___ | 1 | 1:1 | 150 | 4 |
| 15 | B.38 | 2.5 | ___do___ | 2.5 | 1:1 | 105 | 4 |
| 16 | B.38 | 5 | ___do___ | 5 | 1:1 | 65 | <1 |

[1] Continuous.

In the foregoing and the following tables:
B.34=Dimethyldioctadecyl ammonium montmorillonite.
B.38=Dimethyldioctadecyl ammonium hectorite.
B.Sp=Dimethyldioctadecyl ammonium sepiolite.
"Cereclor"=Halogenated hydrocarbon.
T.C.E.P.=Tris-β-chloroethyl phosphate.
T.T.P.=Tritolyl phosphate.

EXAMPLES 17 AND 18

Two high density polyethylene compositions (the polymer being that sold under the trademark "Rigidex") containing different amounts of a modified clay and a flame retardant were prepared as described for Examples 1–16, except that the mill temperature was 170° C. and pressing temperature was 170° C. The flammability and dripping rate of the compositions and of the polymer without the additives were determined as described for Examples 1–12.

The results obtained were as follows:

| Ex. No. | I Organophilic cation modified clay Type | Parts | II Flame Retardant Type | Parts | Ratio I:II | Rate of Burning (secs.) | Dripping rate |
|---|---|---|---|---|---|---|---|
| Blank 2 | | | | | | 360 | (1) |
| 17 | B.8p | 2 | "Cereclor" 70 | 2 | 1:1 | 300 | 14 |
| 18 | B.8p | 4 | ....do.... | 4 | 1:1 | 285 | 11 |

1 Continuous.

EXAMPLES 19–23

A series of polypropylene compositions containing modified clay and various flame retardants were prepared as described for Examples 1–16, except that the mill temperature was 170° C. and the pressing temperature was 170° C., and the flammability and dripping rate of the compositions and of the polymer without the additives were determined as described for Examples 1–12.

The results obtained were as follows:

| Ex. No. | I Organophilic cation modified clay Type | Parts | II Flame Retardant Type | Parts | Ratio I:II | Rate of Burning (secs.) | Dripping rate |
|---|---|---|---|---|---|---|---|
| Blank 3 | | | | | | 264 | (1) |
| 19 | B.38 | 2 | "Cereclor" 70 | 10 | 1:5 | 220 | 20 |
| 20 | B.38 | 2 | {"Cereclor" 70, Sb₂O₃} | {10, 5} | 1:7.5 | 230 | 2-3 |
| 21 | B.38 | 2 | {"Cereclor" 70, Sb₂O₃} | {5, 5} | 1:5 | 205 | 1-2 |
| 22 | B.38 | 2 | T.C.E.P | 5 | 1:2.5 | 150 | <1 |
| 23 | B.38 | 2 | T.C.E.P | 2.5 | 1:1.25 | 170 | 1 |

1 Continuous.

EXAMPLES 24 AND 25

Two nylon 11 compositions containing modified clay and flame retardant were prepared and the flammability and drip rate of these compositions and of the unmodified polymer were determined as described for Examples 1–12.

To prepare the compositions, a gel of the modified clay and the flame retardant was prepared as described for Examples 1–16, except that methanol was omitted in the case of the composition containing an organophilic cation modified zeolite clay as the modified clay. The polymer was fluxed in an internal mixer at 240° C. for 2 minutes; the pre-prepared modified clay/flame retardant gel was then added and mixing was continued for a further 5 minutes. The resultant mass was removed and pressed at 230° C. into sheets ⅛ in. thick; speciments measuring 4½ in. x ½ in. were cut from these sheets for testing.

The results obtained were as follows:

| Ex. No. | I Organophilic cation modified clay Type | Parts | II Flame Retardant Type | Parts | Ratio I:II | Rate of Burning (secs.) | Dripping rate |
|---|---|---|---|---|---|---|---|
| Blank 4 | | | | | | 173 | (1) |
| 24 | B.38 | 4 | T.C.E.P | 9 | 1:1.25 | 206 | 7 |
| 25 | B.27 | 4 | T.C.E.P | 9 | 1:1.25 | 163 | 5 |

1 Continuous.

Note.—B.27 = An organophilic zeolitic clay.

EXAMPLE 26

100 parts of a toughened polystyrene (sold under the Registered Trademark "Carinex" natural N 3001 TGX by the Shell Chemical Co. Ltd.) was milled on a heated two roll mill at 160° C. until fluxed. The modified clay and fire retardant were added gradually and mixing was continued for 5 minutes after all the additive had been incorporated into the polymer. The rough crepe of polymer thus produced was pressed into sheets 6 in. x 4 in. x ⅛ in., which were tested for dripping and gave the following results:

| Example No. | I Organophilic cation modified clay Type | Parts | II Flame Retardant Type | Parts | Ratio I:II | Dripping rate |
|---|---|---|---|---|---|---|
| Blank 5 | | | | | | 20 |
| Blank 6 | | | T.C.E.P | 5 | | 20 |
| 26 | B.38 | 2 | T.C.E.P | 5 | 1:2.5 | 2 |

I claim:

1. A solid polymer composition having flame retardant and drip resistant properties comprising a thermoplastic polymer selected from the group consisting of polyamides, polystyrene, polyethylene and polypropylene, and incorporated therein, at least one flame retardant and from 0.5 to 10%, based on the weight of the polymer, of an organophilic cation modified clay.

2. A polymer composition according to claim 1, which comprises a total of from 0.5 to 50% of flame retardant and from 0.5 to 5% organophilic cation modified clay, said proportions being based on the weight of the polymer.

3. A polymer composition according to claim 2, in which the flame retardant is selected from the group consisting of chlorinated paraffins, tris-β-chloroethyl phosphate, tribromophenol, ammonium chloride, ammonium bromide, phosphoric acid esters, antimony trioxide and arsenic trioxide.

4. A polymer composition according to claim 2, in which the organophilic cation modified clay is selected from the group consisting of dimethyl dioctadecyl ammonium sepiolite, octadecyl ammonium montmorillonite, dimethyl dioctadecyl ammonium montmorillonite and dimethyl dioctadecyl ammonium hectorite.

5. A polymer composition according to claim 2, in which the organophilic cation modified clay is a cationic clay of high cation exchange capacity which is associated with a compound selected from the group consisting of aliphatic amines containing at least 12 carbon atoms and derivatives thereof.

References Cited

UNITED STATES PATENTS

| | | | |
|---|---|---|---|
| 2,531,427 | 5/1946 | Hauser | 260—448 |
| 2,874,139 | 7/1954 | Symons | 260—37 |
| 2,531,396 | 11/1950 | Carter et al. | 260—41.5 |
| 2,676,892 | 4/1954 | McLaughlin | 106—86 |
| 2,743,188 | 4/1956 | Nunter | 106—287 |
| 3,014,001 | 12/1961 | Murray | 260—28.5 |

FOREIGN PATENTS 589,819  12/1959  Canada.

OTHER REFERENCES

"The Condensed Chemical Dictionary" 6th edition: Reinhold Publ. 1961 pgs. 135–136.

"Modern Plastics Encyclopedia" September 1967, vol. 45/No. 1A, pgs. 427–428.

MORRIS LIEBMAN, Primary Examiner

S. L. FOX, Assistant Examiner

U.S. Cl. X.R.

260—28.5, 37, 41; 106—15, 72